United States Patent [19]
Bhattacharya

[11] Patent Number: 5,918,072
[45] Date of Patent: Jun. 29, 1999

[54] SYSTEM FOR CONTROLLING VARIABLE LENGTH PCI BURST DATA USING A DUMMY FINAL DATA PHASE AND ADJUSTING THE BURST LENGTH DURING TRANSACTION

[75] Inventor: Dipankar Bhattacharya, Santa Clara, Calif.

[73] Assignee: OPTi Inc., Milpitas, Calif.

[21] Appl. No.: 08/531,144

[22] Filed: Sep. 18, 1995

[51] Int. Cl.[6] .............................. G06F 13/00; G06F 13/28
[52] U.S. Cl. ......................... 395/855; 395/853; 395/849; 395/552
[58] Field of Search ................................... 395/821, 849, 395/855, 853, 552

[56] References Cited

U.S. PATENT DOCUMENTS

| | | | |
|---|---|---|---|
| 5,649,161 | 7/1997 | Andrade et al. | 395/494 |
| 5,664,124 | 9/1997 | Katz et al. | 395/309 |
| 5,680,556 | 10/1997 | Begun et al. | 395/311 |

OTHER PUBLICATIONS

PCI Special Interest Group, "PCI Local Bus Specification", Revision 2.0 (Apr. 30, 1993).

*Primary Examiner*—Thomas C. Lee
*Assistant Examiner*—Rehana Perveen
*Attorney, Agent, or Firm*—Fliesler Dubb Meyer & Lovejoy

[57] ABSTRACT

A host-bus-to-PCI-bus bridge circuit waits until the PCI-bus clock cycle in which the PCI-bus data transfer corresponding to a current data write access on the originating bus actually takes place, before deciding whether a next data write access is pending on the originating bus and is burstable on the PCI-bus with the current data write access. If so, then the bridge continues the burst with the data of the new data write access. If not, the bridge terminates the PCI-bus burst write transaction by asserting IRDY# and negating FRAME# for the immediately subsequent PCI-bus clock cycle. A final data phase takes place on the PCI-bus in response to these actions, but all data transfer is inhibited because the bridge negates all of the byte-enable signals (BE#(3:0)). An increased likelihood results that successive data write accesses on the originating bus can be collected into a single burst transaction on the PCI-bus.

30 Claims, 5 Drawing Sheets

1

SYSTEM FOR CONTROLLING VARIABLE LENGTH PCI BURST DATA USING A DUMMY FINAL DATA PHASE AND ADJUSTING THE BURST LENGTH DURING TRANSACTION

BACKGROUND

1. Field of the Invention

The invention relates to computer systems having a bridge for translating write accesses from an originating bus to a destination bus where the bridge collects such write accesses for bursting on the destination bus and, more particularly, techniques for increasing the likelihood that several such write accesses can be collected into a single burst.

2. Description of Related Art

The IBM PC/AT® computer architecture has become an industry standard architecture for personal computers and is typically built around a host CPU such as an 80386, 80486 or Pentium® microprocessor manufactured by Intel Corporation, or similar microprocessors manufactured by others. The host CPU is coupled to a host bus, capable of performing memory accesses and data transfers at high rates of speed (i.e., on the order of 50–100 MHz with today's technology). The host bus includes 32 or, in the case of computers built around the Pentium, 64 data lines, a plurality of address lines, and various control lines. The typical IBM PC AT-compatible platform also includes DRAM main memory and a level two (L2) cache memory.

The typical IBM PC AT-compatible computer also includes an I/O bus, also know as a system bus or AT-bus, which is separate and distinct from the host bus. The system bus usually conforms to an industry-established standard known as ISA (Industry Standard Architecture). The system bus is coupled to the host bus via a host-bus/system-bus bridge, and includes 16 data lines, a plurality of address lines, as well as control lines. The I/O address space is logically distinct from the memory address space and if the CPU desires to access an I/O address, it does so by executing a special I/O instruction. Such an I/O instruction generates memory access signals on the host bus, but also activates an M/IO# signal on the host bus to indicate that this is an access to the I/O address space. The host-bus/system-bus bridge recognizes the I/O signals thereby generated by the CPU, performs the desired operation over the system bus, and if appropriate, returns results to the CPU over the host bus.

In practice, some I/O addresses may reside physically on the host bus and some memory addresses may reside physically on the system bus. The host-bus/system-bus bridge is responsible for recognizing that a memory or I/O address access must be translated to the other bus, and is responsible for doing such translation.

General information on the various forms of IBM PC AT-compatible computers can be found in IBM, "Technical Reference, Personal Computer AT" (1985), in Sanchez, "IBM Microcomputers: A Programmer's Handbook" (McGraw-Hill: 1990), in MicroDesign Resources, "PC Chip Sets" (1992), and in Solari, "AT Bus Design" (San Diego: Annabooks, 1990). See also the various data books and data sheets published by Intel Corporation concerning the structure and use of the iAPX-86 family of microprocessors, including Intel Corp., "Pentium™ Processor", Preliminary Data Sheet (1993); Intel Corp., "Pentium™ Processor User's Manual" (1994); and "i486 Microprocessor Hardware Reference Manual", published by Intel Corporation, copyright date 1990. All the above references are incorporated herein by reference.

3. PCI-Bus Description

Many personal computer systems today also include a PCI-bus, which is a high-speed peripheral bus that substitutes, in large part, for the ISA-compatible system bus. The PCI-bus is defined in PCI Special Interest Group, "PCI Local Bus Specification", Revision 2.0 (Apr. 30, 1993)., and in PCI Special Interest Group, "PCI Local Bus Specification", Revision 2.1 (Jun. 1, 1995), both incorporated herein by reference. The PCI-bus is a 32-bit or 64-bit bus with multiplexed address and data lines, and is intended for use as an interconnect mechanism between highly integrated peripheral controller components, peripheral add-in boards, and processor/memory systems. As used herein, a PCI-bus is a bus which satisfies the pertinent requirements of the above-incorporated PCI 2.0 specification (whether or not it also conforms to subsequent revisions of such specification or to some other specification).

The PCI 2.0 specification defines a number of PCI-bus signals, and only pertinent ones are set forth below. The second column indicates a signal type as is defined in as follows:

SIGNAL TYPE DEFINITIONS t/s bi-directional signal.

s/t/s active low 3-state signal owned and driven by only one agent at a time. That agent drives the pin low and must drive it high for at least one clock before letting it float. A new agent cannot start driving the signal any sooner than one clock after the previous owner lets it float. A pull-up is provided by a central resource.

PCI-BUS SIGNALS

AD(31:00) t/s

Address and Data are multiplexed on the same PCI pins. A bus transaction consists of an address phase followed by one or more data phases. The DAC command uses two address phases to transfer a 64-bit address. PCI supports both read and write bursts. The address phase is the clock cycle in which FRAME# is asserted. During the address phase AD(31:00) contain a physical address (32 bits). For I/O, this is a byte address; for configuration and memory it is a DWORD address. During data phases AD(07:00) contain the least significant byte (lsb) and AD(31:24) contain the most significant byte (msb). Write data is stable and valid when IRDY# is asserted and read data is stable and valid when TRDY# is asserted. Data is transferred during those clocks where both IRDY# and TRDY# are asserted.

C/BE#(3:0) t/s

Bus Command and Byte Enables are multiplexed on the same PCI pins. During the address phase of a transaction, C/BE#(3:0) define the bus command. During the data phase C/BE#(3:0) are used as Byte Enables. The Byte Enables are valid for the entire data phase and determine which byte lanes carry meaningful data. C/BE#(0) applies to byte 0 (lsb) and C/BE#(3) applies to byte 3 (msb). Any contiguous or non-contiguous combination of byte enables can be asserted for a given data phase. The PCI-bus specification states that if no byte enables are asserted, the target of the access must complete the transaction by asserting TRDY#.

FRAME# s/t/s

Cycle Frame is driven by the current master to indicate the beginning and duration of an access. FRAME# is asserted to indicate a bus transaction is beginning. While FRAME# is asserted, data transfers continue. When FRAME# is deasserted, the transaction is in the final data phase.

IRDY# s/t/s

Initiator Ready indicates the initiating agent's (bus master's) ability to complete the current data phase of the transaction. IRDY# is used in conjunction with TRDY#. A data phase is completed on any clock both IRDY# and TRDY# are sampled asserted. During a write, IRDY# asserted indicates that valid data is present on AD(31:00). During a read, it indicates the master is prepared to accept data. Wait cycles are inserted until both IRDY# and TRDY# are asserted together.

TRDY# s/t/s

Target Ready indicates the target agent's (selected device's) ability to complete the current data phase of the transaction. TRDY# is used in conjunction with IRDY#. A data phase is completed on any clock both TRDY# and IRDY# are sampled asserted. During a read, TRDY# asserted indicates that valid data is present on AD(31:00). During a write, it indicates the target is prepared to accept data Wait cycles are inserted until both IRDY# and TRDY# are asserted together.

STOP# s/t/s

Stop indicates the current target is requesting the master to stop the current transaction.

DEVSEL# s/t/s

Device Select, when actively driven, indicates the driving device has decoded its address as the target of the current access. As an input, DEVSEL# indicates whether any device on the bus has been selected.

Note that some of the signals described in this specification are asserted high, whereas others are asserted low. As used herein, signals which are asserted low are given a '#' or 'B' suffix in their names, whereas those asserted high lack a '#' or 'B' suffix. Signals for which an assertion polarity has no meaning may or may not include a '#' or 'B' suffix. Also, two signal names mentioned herein that are identical except that one includes the '#' or 'B' suffix while the other omits it, are intended to represent logical compliments of the same signal. It will be understood that one can be generated by inverting the other, or both can be generated by separate logic in response to common predecessor signals.

All of the above PCI-bus signals are sampled on the rising edge which terminates each PCI-bus clock signal. The signals are therefore referred to herein as being asserted or negated "for" a particular clock edge or clock cycle. Each signal has a setup and hold aperture with respect to the rising clock edge, within which transitions are not allowed. Outside this aperture, signal values or transitions have no significance. This aperture occurs only on "qualified" clock rising edges for AD(31:0), and on every clock rising edge for IRDY#, TRDY#, FRAME# DEVSEL# and STOP#. C/BE# (3:0) (as a bus command) is qualified on the clock rising edge for which FRAME# is first asserted. C/BE#(3:0) (as a byte enable) is qualified on each clock rising edge following the completion of an address phase or data phase. Note that because signal values and transitions occurring outside the setup and hold aperture have no significance, if a signal is referred to herein as being "maintained" at a particular value, it is sufficient that it be brought to that value in time for sampling on each clock cycle. Also, as used herein, the terms "assert" and "negate" do not necessarily imply that the signal was not already in its asserted or negated state, respectively.

The PCI-bus specification defines three physical address spaces: a memory address space, an I/O address space and a configuration address space. The memory and I/O address spaces are customary and in a PC/AT-compatible computer system correspond to the processor's memory and I/O address spaces. The configuration address space is defined to support PCI hardware configuration.

The high-order bits AD(31:2) of an address are sufficient to specify a double word ("dword") address, and the information contained in the low-order two address bits AD(1:0) varies by address space. In the memory address space, since byte addresses are handled by the BE# enable signals, AD(1:0) are used to indicate whether the coming burst is to follow dword addresses which increment linearly (i.e. by one dword after each data phase until the transaction is terminated) or according to a "cache line toggle mode" (similar to the cache fill ordering used in the Intel 486™ processor). The specification requires all PCI-bus devices to support linear bursting if they support bursting at all; implementation of cache line toggle bursting is optional.

The basic data transfer mechanism on a bus satisfying the PCI-bus 2.0 specification is a burst transaction. Such a transaction includes an address phase and one or more data phases. According to the specification, a host bridge (that resides between the host processor or other host bus, and the PCI-bus) may merge (or assemble) memory write accesses into a single transaction when no side effects exist. A device indicates no side effects (allowing prefetching of read data and merging of write data in any order) by setting the prefetch bit in the base address register. A bridge may distinguish where merging is allowed and where it is not, by an address range which could be provided by configuration software during initialization.

I/O space accesses from the host bus will normally be translated onto a PCI-bus with only a single data phase. However, bursting of such accesses on the PCI-bus is not precluded by the PCI-bus specification. There is no implied address incrementing on I/O bursts, so when I/O bursts are performed, the target and master must mutually understand the implied address incrementing.

Bus Commands are encoded on the C/BE#(3:0) lines during the address phase of a transaction. Bus Commands indicate to the target the type of transaction the master is requesting. They include a number of different transaction types, the most pertinent to the present discussion being the Memory Write command, which is used to write data to an agent mapped in the memory address space.

According to the PCI-bus specification, after arbitration if appropriate, the fundamentals of all PCI data transfers are controlled with three signals as follows:

FRAME# is driven by the initiator of a transaction to indicate the beginning and end of the transaction.

IRDY# is driven by the initiator, allowing it to force wait cycles.

TRDY# is driven by the target of the transaction, allowing it to force wait cycles.

The interface is idle when both FRAME# and IRDY# are deasserted. The first rising clock edge on which FRAME# is sampled asserted is the address phase, and the address and bus command code are transferred on that clock edge. The next rising clock edge begins the first of one or more data phases, during which data is transferred between initiator and target on each clock edge for which both IRDY# and TRDY# are asserted. Wait states may be inserted in a data phase by either the initiator or the target negating its IRDY# or TRDY# signal, respectively.

The source of the data is required to assert its xRDY# signal unconditionally when data is valid (IRDY# on a write transaction, TRDY# on a read transaction). The receiving agent may assert its xRDY# as it chooses.

Once the initiator has asserted IRDY# it cannot change IRDY# or FRAME# until the current data phase completes regardless of the state of TRDY#. Once a target has asserted TRDY# or STOP# it cannot change DEVSEL#, TRDY# or STOP# until the current data phase completes. Neither the initiator nor the target can change its mind once it has committed to the data transfer.

At such time as the initiator intends to complete only one more data transfer (which could be immediately after the address phase), it negates FRAME# for such final data transfer and asserts IRDY# to indicate that it is ready for the transfer. After the target indicates the final data transfer (by asserting TRDY#), the interface returns to the idle state with both FRAME# and IRDY# deasserted.

The PCI-bus specification allows termination of a PCI-bus transaction by either the initiator or the target. While neither can actually stop the transaction unilaterally, the initiator remains in ultimate control, bringing all transactions to an orderly and systematic conclusion regardless of what caused the termination. All transactions have been concluded if FRAME# and IRDY# are both deasserted, indicating an idle cycle.

Normal termination occurs when the master negates FRAME# with IRDY# asserted. This signals the target that the final data phase is in progress. The final data transfer occurs when both IRDY# and TRDY# are asserted. The transaction reaches completion when both FRAME# and IRDY# are deasserted (idle bus condition). The PCI-bus specification defines other transaction termination mechanisms, but these are not important for an understanding of the present invention.

In summary, the following general rules govern FRAME# and IRDY# in all PCI-bus transactions defined in the PCI-bus 2.0 specification.

1. FRAME# and its corresponding IRDY# define the busy/IDLE state of the bus; when either is asserted, the bus is busy; when both are deasserted, the bus is IDLE.
2. Once FRAME# has been deasserted, it cannot be reasserted during the same transaction.
3. FRAME# cannot be deasserted unless IRDY# is asserted. (IRDY# must always be asserted on the first clock edge that FRAME# is deasserted.)
4. Once a master has asserted IRDY#, it cannot change IRDY# or FRAME# until the current data phase completes.

FIG. 1 illustrates a typical data write transaction according to the PCI-bus specification. It begins with an address phase which occurs in clock 2 when FRAME# is asserted for the first time by the transaction initiator. During the address phase AD(31:02) contain a valid address and C/BE#(3:0) contain a valid bus command.

The first clock of the first data phase is clock 3. During the data phase C/BE# indicate which byte lanes (i.e. which bytes of the data path) are involved in the current data phase. A data phase includes a data transfer and may also include wait states inserted by the initiator or target before the data transfer.

The first data phase on a write transaction can occur as early as the clock cycle in which DEVSEL# is asserted by the target. A data phase completes when data is transferred, which occurs when both IRDY# and TRDY# are sampled asserted together on the same clock rising edge. (TRDY# cannot be driven until DEVSEL# is asserted.) When either IRDY# or TRDY# is deasserted, a wait cycle is inserted and no data is transferred. As noted in the diagram, data is successfully transferred on clocks 3, 4 and 8, and wait cycles are inserted on clocks 5, 6 and 7.

The initiator knows at clock 5 in this example that the next data phase is the last. However, because the initiator is not ready to complete the last transfer (IRDY# is deasserted for clock 5), FRAME# remains asserted. Only when the initiator negates IRDY# can it also negate FRAME#, and this occurs for clock cycle 6 in FIG. 1. The final data transfer takes place on clock cycle 8, for which both IRDY# and TRDY# are asserted with FRAME# negated. IRDY#, TRDY# and FRAME# are all negated in clock cycle 9, indicating that the bus is now idle.

4. Effects of Optimization for Burst Transfers

Because the basic data transfer transaction on the PCI-bus is a burst, the data transfer protocol is optimized for burst transfers. This means that whereas transfers can take place in rapid succession once a transaction begins, a significant penalty is incurred each time one transaction ends and a new transaction begins. In the case of the PCI-bus, the penalty includes a requirement for a new address phase, as well as bus turn-around cycles. Accordingly, it is desirable to maximize the length of any burst data write transactions on the PCI-bus by collecting into a single burst as many individual data write accesses as possible before terminating the burst.

In conventional computer systems in which a host processor originates most of the write accesses destined for the PCI-bus, host-to-PCI bridges have been developed which automatically detect when a new write access from the processor is "burstable" on the PCI-bus with a write access presently in progress. A second data write access is referred to herein as being "burstable" with a first data write access if the second access is to an address on the PCI-bus which is next-in-order with the address of the first data write access according to the burst order then in force (e.g., linear or cache line toggle). In addition, some conventional bridges can collect two data write accesses into a single burst even if they designate destination addresses which are separated by one or more dwords according to the burst order then in force; such bridges accomplish this by inserting an appropriate number of dummy data phases on the PCI-bus between the two data transfers called for by the host processor. A dummy data phase is a data phase in which the bridge negates all byte-enable signal lines (BE#(3:0)), thereby inhibiting any actual data transfer in that data phase. The term "burstable" as used herein is intended to include write accesses which can be made satisfy the burst ordering then in force by using techniques such as this.

Still further, some conventional bridges are intelligent enough to ignore host bus cycles which are not destined for the PCI-bus and take place between two otherwise burstable data write accesses, as long as the bridge is able to detect the burstability of the later write access early enough to avoid terminating the PCI-bus burst transaction.

In all of the conventional techniques for collecting host bus data write accesses for translation into a single burst data write transaction on the PCI-bus, it is necessary for the bridge to be able to detect a next write access on the originating bus, and determine its burstability on the PCI-bus, no later than the clock cycle (clock rising edge) prior to that in which the bridge first asserts IRDY# to transfer data for the current data write access. That is, still using FIG. 1 as an example, if the bridge is going to assert IRDY# for PCI-bus clock cycle 6, to transfer the data of a third host bus data write access, then the bridge needs to detect the fourth host bus data write access, and determine its burstability with the third host bus data write access, no later than PCI-bus clock cycle 5. This is because if the bridge fails to detect any such burstable data write access by that time, then it must negate the PCI-bus FRAME# signal for the data phase in which the current (third) host bus data write access data is transferred. The PCI-bus specification requires the bridge to negate FRAME# only for the final data phase of a burst write transaction.

Unfortunately, this time deadline is often not met. Delays in the core logic chip set can sometimes prevent host bus cycles from completing quickly enough to permit the next data write access from being issued and recognized early enough. In some systems, the busing delays of addresses and data from the processor to the PCI-bus also can prevent host bus cycles from terminating quickly enough. Still further, decoding delays in the bridge can sometimes require more time to complete than is available, in which case the pendency of the next data write access on the host bus might be detected, but its burstability with the current data write access might not be determinable in time. Still further, the processor itself might be occupied with other activities between the current and next data write accesses, and therefore delay the next data write access for a time period longer than the bridge can tolerate.

SUMMARY OF THE INVENTION

Accordingly, it is an object of the invention to overcome or ameliorate some of the above problems.

It is another object of the invention to increase the tolerance of a bridge circuit to delays between originating bus data write accesses, thereby increasing the likelihood that two otherwise burstable data write accesses will be collected into a single burst transaction on the PCI-bus.

According to the invention, roughly described, a bridge circuit waits until the PCI-bus clock cycle in which the PCI-bus data transfer corresponding to a current data write access on the originating bus actually takes place, before deciding whether a next data write access is pending on the originating bus and is burstable on the PCI-bus with the current data write access. If so, then the bridge continues the burst with the data of the new data write access. If not, the bridge terminates the PCI-bus burst write transaction by asserting IRDY# and negating FRAME# for the immediately subsequent PCI-bus clock cycle. An additional, final data phase does take place on the PCI-bus in response to these actions, but all data transfer is inhibited in that data phase because the bridge negates all of the byte-enable signals (BE#(3:0)).

It is apparent that a bridge according to the invention can tolerate a delay of at least one more PCI-bus clock cycle than can a conventional bridge, before it needs to terminate a burst. In situations where the target of the transaction inserts wait states by negating TRDY#, delays of more than one additional PCI-bus clock cycle can be tolerated because the bridge does not need to make its decision until the PCI-bus clock cycle on which the preceding data is actually transferred. Thus, an increased likelihood results that successive data write accesses on the originating bus can be collected into a single burst transaction on the PCI-bus.

BRIEF DESCRIPTION OF THE DRAWINGS

The invention will be described with respect to particular embodiments thereof, and reference will be made to the drawings, in which.

DETAILED DESCRIPTION

Figure 1:
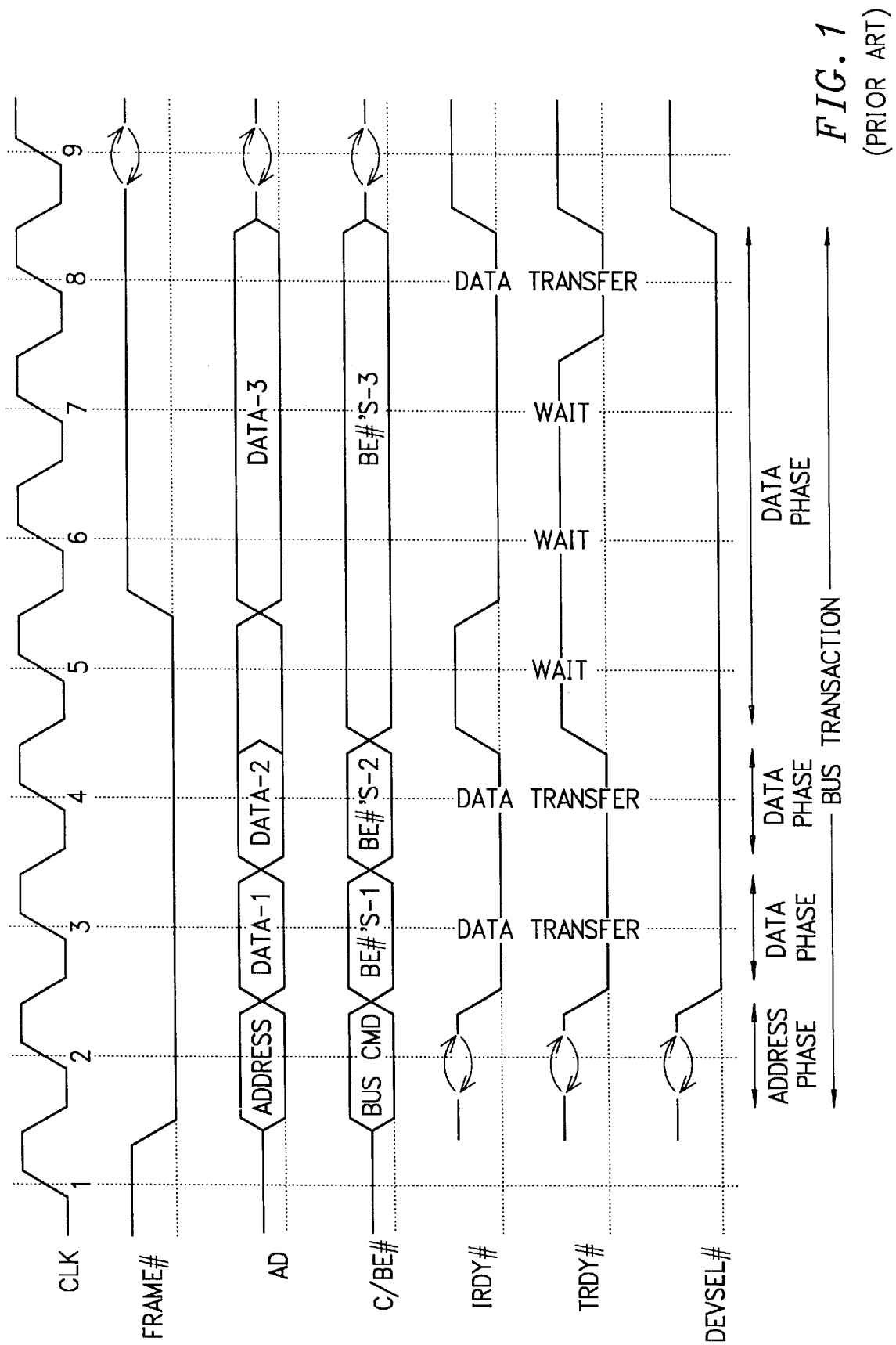
FIG. 1 is a timing diagram of a conventional PCI-bus burst write data transaction.
Figure 2:
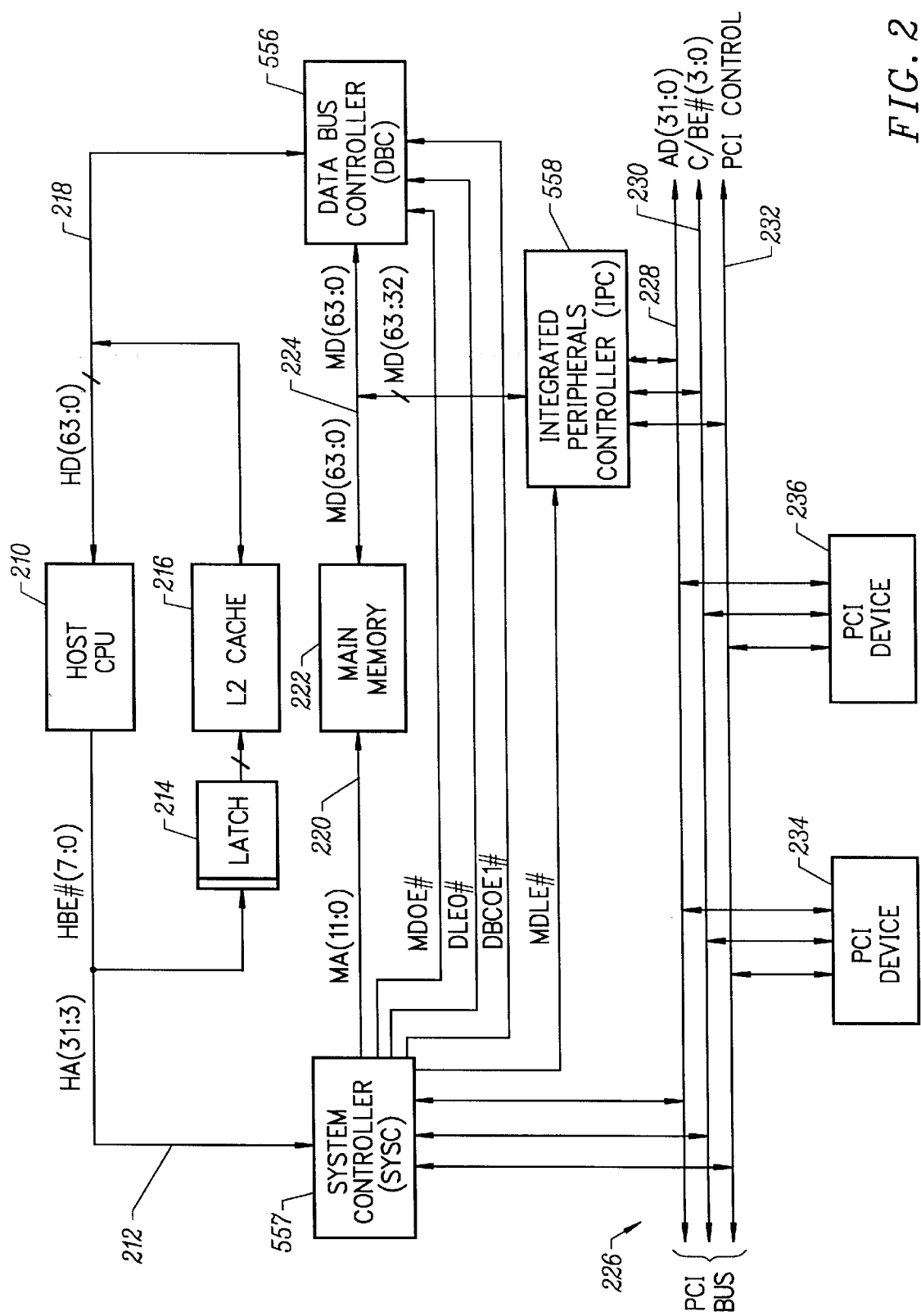
FIG. 2 is a block diagram of a computer system incorporating the invention.

FIG. 2 is a block diagram of a computer system incorporating the invention. It comprises a CPU 210, which in the present embodiment is an Intel Pentium processor. The CPU 210 is connected to a host bus which includes a 64-bit host data portion HD(63:0), a host control portion (not shown in FIG. 2), and a host address portion 212 which includes address leads HA(31:3) and byte-enable leads HBE#(7:0). The address portion 212 of the host bus is coupled via a latch 214 to address input leads of an L2 cache memory 216. The data leads of the L2 cache 216 are coupled bi-directionally with the data portion 218 of the host bus. The address portion 212 of the host bus is also coupled to a system controller (SYSC) 557, which produces a number of signals for controlling aspects of the computer system. Only pertinent ones of such signals are shown in FIG. 2 and described herein. The system controller 557 is connected to drive address signals MA(11:0) onto a memory address bus 220, which is connected to address inputs of a main memory 222. The main memory 222 can comprise DRAM, EDO DRAM, and/or other types of memory. The data port of main memory 222 is connected bi-directionally to a data bus controller (DBC) 556 via a memory data bus MD(63:0) 224. The data bus controller 556 is also coupled bi-directionally with HD(63:0). The system also includes an integrated peripherals controller (IPC) 558. IPC 558 has a 32-bit wide data port which is coupled bi-directionally with the high-order 32 bits of the memory data bus 224, specifically signal lines MD(63:32). Both the system controller 557 and the IPC 558 are coupled bi-directionally with a PCI-bus 226, which includes a 32-bit multiplexed address/data portion AD(31:0) 228, a command/byte-enable portion C/BE#(3:0) 230, and various PCI-bus control leads 232. Two PCI devices 234 and 236 are also shown coupled to the PCI-bus 226.

In addition to certain standard host bus and PCI-bus signals, the system controller 557 drives four control signals which are pertinent to the present description. They are described in Table I.

TABLE I

| Signal Name | Provided To | Signal Description |
| --- | --- | --- |
| MDOE# | DBC 556 | Memory data output enable. When asserted, this signal enables data from the DBC 556 onto the MD bus 224. MDOE# is asserted for CPU writes to cache/main memory, CPU writes to the PCI-bus, PCI-bus reads from the cache/main memory, L2 cache write-back cycles, and PCI-bus writes to DRAM. |
| DLE0# | DBC 556 | Data latch enable. Causes the DBC 556 to latch the data on HD(63:0) for output onto the memory data bus 224. The latches in DBC 556 are transparent when DLE0# is low, and latched when DLE0# is high. |
| DBCOE1 | DBC 556 | DBC data steering output enable. When data is enabled from DBC 556 onto the memory data bus 224 (MDOE# = 0), DBCOE1# = 1 selects the high-order latched dword onto MD(63:32), and DBCOE1# = 0 selects the low half of the latched data onto MD(63:32). |

TABLE I-continued

| Signal Name | Provided To | Signal Description |
|---|---|---|
| MDLE# | IPC 558 | Memory data latch enable. Causes the IPC 558 to latch the data on MD(63:32) for providing to the PCI-bus AD(31:0) lines. The enabling of this data onto AD(31:0) is performed internally in the IPC 558. The data latches in IPC 558 are transparent when MDLE# = 0 and latched when MDLE# = 1. |

The system controller 557, the data bus controller 556 and the integrated peripherals controller 558 are described in more detail in OPTi, Inc., "82C556M/82C557M/82C558M Viper-M (Multimedia) Chipset, Preliminary Data Book", Rev. 1.0 (April 1995), incorporated herein by reference. These three units, which are implemented on three separate integrated circuit chips, together comprise a core logic chipset for the system of FIG. 2, and the portion which translates data write accesses from the host bus onto the PCI-bus 226, can be referred to as a host-to-PCI-bus bridge. Different parts of the bridge circuitry are located physically on different ones of the three chips, with the PCI-bus state machine, to the extent it is pertinent to the present description, being implemented on the system controller 557 and tracked on the IPC 558. During the translation of memory write accesses from the host bus to the PCI-bus 226, AD(31:0) are driven by the system controller 557 during the address phase of the PCI-bus transaction, and driven by the IPC 558 during each data phase of the PCI-bus transaction. C/BE#(3:0) are driven by the system controller 557 during all phases of the PCI-bus transaction, and the PCI-bus control signals FRAME# and IRDY# are also driven by the system controller 557 throughout the transaction. The PCI-bus signals DEVSEL#, STOP# and TRDY# are driven by one of the PCI devices 234, 236 or 558.

On the host bus, the host bus ADS# signal is driven by the host CPU 210 and sampled by system controller 557, which later responds by asserting BRDY# back to the host CPU 210. The system controller 557, integrated peripherals controller 558 and the PCI-bus 226 all receive a PCI-bus clock signal generated by a clock generator (not shown), which also generates a CPU clock signal for the host CPU 210 and the system controller 557. In the embodiment described herein, the PCI-bus clock signal is synchronous to, but half the frequency of, the CPU clock signal. Several other synchronous and asynchronous clocking arrangements are also possible, as will be understood by a person of ordinary skill.

Figure 3:
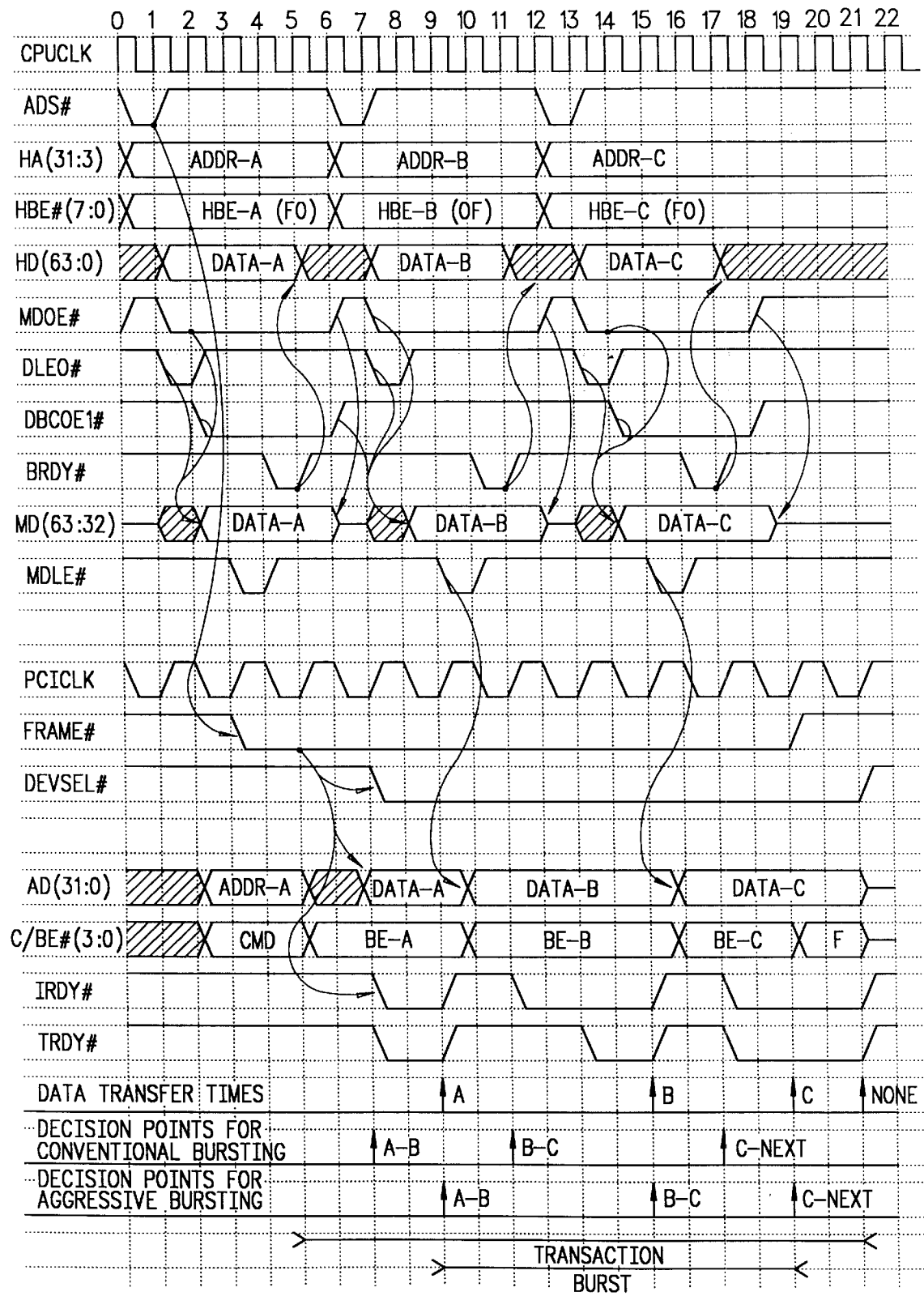
FIG. 3 is a timing diagram for the system of FIG. 2.

FIG. 3 is a timing diagram illustrating the operation of the system of FIG. 2 in response to a sequence of three 32-bit data write accesses issued by the host CPU 210 to sequential dword addresses which are all claimed by one of the PCI-bus devices 234. In the figure, the CPU clock cycles are numbered as of their rising edges (each clock cycle is considered herein to terminate in a rising edge). For simplicity of description, the PCI-bus clock cycles are numbered using the same clock cycle numbers as the CPU clock signal, but since the PCI-bus clock operates at half the frequency, only odd numbered PCI-bus clock cycles exist (those terminating at rising edges of the PCI-bus clock signal).

Referring to FIG. 3, in CPU clock cycle 1, the CPU 210 drives the address of the first data write access, referred to herein as access A, onto HA(31:3), and drives byte-enable signals onto HBE#(7:0). Data write access A is assumed to be a 32-bit access to an even-numbered dword in the memory address space, so the CPU 210 drives HBE#(7:0) to the value F0 (hex) to indicate that only the low-order dword contains valid data. The CPU 210 asserts ADS# for CPU clock cycle 1 and then begins driving the data for the data write access A onto HD(31:0) in clock cycle 2.

The system controller 557 samples ADS# asserted on CPU clock cycle 1, and in response thereto, asserts MDOE# to enable the buffers of data bus controller 556 onto the memory data bus 224. Also in response to ADS# sampled asserted on clock cycle 1, the system controller 557 asserts DLEO# to cause the data bus controller 556 data latches to go transparent, and after CPU clock cycle 2, drives DBCOE1# low to route the low-order latched dword onto to MD(63:32). Thus, some time after CPU clock cycle 2, the data for the CPU's write access A is valid on MD(63:32). The system controller 557 then asserts MDLE# for CPU clock cycle 4, thereby latching the data into IPC 558. It then asserts BRDY# back to the host CPU 210 for clock cycle 5.

Also in response to sampling ADS# asserted in CPU clock cycle 1, after a delay for synchronization and other purposes, the system controller 557 asserts FRAME# on the PCI-bus 226 after PCI-bus clock cycle 3. By this time, the system controller 557 has already driven the address of the CPU's write access A onto the PCI-bus AD(31:2) lines, and driven the appropriate code onto AD(1:0) to call for linear address incrementing. It has also driven the command code for the write data transaction onto the PCI-bus C/BE#(3:0) lines. The address phase of the transaction takes place in PCI-bus clock cycle 5.

The system controller 557 begins driving the byte enables for-access A onto C/BE#(3:0) after PCI-bus clock cycle 5. These byte-enable signals are the same as those provided by the CPU on HBE#(3:0) for write access A. The system controller 557 also at this time allows AD(31:0) to float so that they may be driven beginning after PCI-bus clock cycle 7 by the integrated peripherals controller 558 with the data of write access A. Also, after PCI-bus clock cycle 7, the system controller 557 asserts IRDY# on the PCI-bus 226 to indicate its readiness for the first data transfer of the burst. It is assumed in FIG. 3 that the PCI device 234 also asserts the PCI-bus DEVSEL# signal, as well as TRDY#, after PCI-bus clock cycle 7. Accordingly, the first data phase begins after PCI-bus clock cycle 7, with the data transfer taking place at the rising edge of PCI-bus clock cycle 9. The data of the CPU's write access A is clocked into the PCI device 234 at that time.

In the meantime, after sampling BRDY# asserted on CPU clock cycle 5, the host CPU 210 begins driving the address of data write access B onto HA(31:3), and the byte-enables onto HBE#(7:0), in CPU clock cycle 7. Because the present illustration assumes three sequential dword data write accesses, the address for access B is the same as that of access A, but the high-order bytes are enabled for access B. That is, HBE#(7:0)=0F (hex). The CPU 210 also asserts ADS# at this time, for CPU clock cycle 7. The CPU 210 drives the data for write access B onto HD(63:32) in CPU clock cycle 8.

The system controller 557, after asserting BRDY# for write access A for CPU clock cycle 5, negates MDOE# in response to CPU clock cycle 6 in order to cause the DBC 556 to float the memory data bus 224. Also in response to CPU clock cycle 6, the system controller 557 brings DBCOE1# high, thereby selecting the high-order data latches in the DBC 556 for driving onto MD(63:31) when enabled. After sampling ADS# asserted on CPU clock cycle 7, the system controller 557 asserts MDOE# low and asserts DLE0# for one CPU clock cycle to latch the data of write access A from the host data bus 218 inside the data bus controller 556. Such data begins appearing on MD(63:32) shortly after DLE0# is brought low (latch is transparent), and is latched into the IPC 558 by a one clock cycle-wide assertion of MDLE# in CPU clock cycle 10. The system controller 557 then asserts BRDY# back to the host CPU 210, so that the CPU 210 samples BRDY# asserted in clock cycle 11.

In the illustration of FIG. 3, a conventional system would have had to break the burst on the PCI-bus between write accesses A and B. This is because if write access B were not burstable on the PCI-bus with write access A, then the conventional bridge would have had to negate FRAME# at the same time that it asserted IRDY#, i.e., after PCI-bus clock cycle 7. As previously mentioned, in a PCI-bus transaction, the initiator terminates the transaction by negating FRAME# for the final data phase of the transaction. But in the illustration of FIG. 3, access B is not issued by the host CPU 210 until CPU clock cycle 7 (ADS# asserted), which is too late to be detected, decoded and determined to be burstable on the PCI-bus with access A early enough to avoid negating FRAME# after clock cycle 7. Therefore, a conventional system would negate FRAME# in PCI-bus clock cycle 9, thereby terminating the transaction. The bridge would then have to begin an entirely new transaction, including a new address phase, in order to transfer the data from write access B over the PCI-bus.

In the system of FIG. 2, on the other hand, the inability to determine the burstability of the CPU's data write access B with write access A, by clock cycle 7, does not cause the system to negate FRAME# in PCI-bus clock cycle 9. Instead, the decision is not made until the clock cycle at which the data for access A is actually transferred over the PCI-bus, i.e., PCI-bus clock cycle 9 in FIG. 3. In the illustration of FIG. 3, this provides sufficient time for the system controller 557 to determine the burstability of access B and avoid terminating the burst.

Thus, after MDLE# goes low for CPU clock cycle 10, rendering the data latches in IPC 558 transparent, the data for write access B begins to appear on AD(31:0). The system controller 557 also drives the byte-enables onto C/BE#(3:0) at this time, which in this case are the same as HBE#(7:4) for access B on the host bus. System controller 557 also negates IRDY# at this time, thereby inserting one PCI-bus wait state to permit the data to stabilize on AD(31:0). (It is assumed that the system of FIG. 2 always inserts one wait state between data transfers in the burst.) The system controller 557 asserts IRDY# after PCI-bus clock cycle 11, but in this illustration, it is assumed that the PCI device 234 has itself inserted two wait states. Thus, TRDY# is negated for both PCI-bus clock cycle 11 and PCI-bus clock cycle 13. Both readys are asserted for PCI-bus clock cycle 15 and the PCI-bus transfer of the data for write access B takes place at that time.

Returning to the host bus, after sampling BRDY# asserted in clock cycle 11, the CPU 210 drives the address of write access C onto HA(31:3) and the appropriate byte-enable information onto HBE#(7:0) in CPU clock cycle 13. Since access C again is assumed to be addressed to the dword following that of access B, the address on HA(31:3) for access C is one quadword higher than that for accesses A and B. HBE#(7:0)=F0 (hex), indicating that only the low-order dword of data will be valid. The CPU asserts ADS# for CPU clock cycle 13, and shortly thereafter drives the data for access C onto HD(31:0).

The system controller 557, after having negated MDOE# after sampling BRDY# asserted, again asserts MDOE# after sampling ADS# asserted on clock cycle 13. It also asserts DLE0# for one CPU clock cycle in response to sampling ADS# asserted on clock cycle 13, to thereby latch the data on HD(63:0) inside the data bus controller 556. The system controller 557 brings DBCOE1# low after clock cycle 14, in order to select the low half of HD onto MD(63:32) when enabled. The data for write access C reaches MD(63:32) beginning shortly thereafter, and is latched inside the IPC 558 in response to a 1-CPU clock cycle-wide assertion of MDLE# by the system controller 557 in CPU clock 16.

Again, a conventional system would have had to detect the burstability of write access C on the PCI-bus 226 with write access B no later than the time at which it asserts IRDY# for the data phase for which the data of access B is transferred to the target device. In the diagram of FIG. 3, this decision point for a conventional system is clock cycle 11. But, the CPU has not even issued the ADS# for write access C by this time. Therefore, a conventional system would break the burst by negating FRAME# after clock cycle 11.

The system of FIG. 2, on the other hand, does not break the burst. Instead, the decision point for the burstability of access C is at clock cycle 15, the time at which data is transferred for access B. Clock cycle 15 is sufficiently later than clock cycle 13, at which ADS# was sampled asserted, to permit the system controller 557 to determine that access C is burstable. This is possible because the system controller 557 speculatively kept FRAME# asserted during the PCI-bus data phase in which access B was transferred. The data of access C begins appearing on AD(31:0) shortly thereafter, and the system controller 557 drives C/BE#(3:0) with the values from HBE#(3:0) of the CPU's access C. It then asserts IRDY# after PCI clock cycle 17. The target PCI device 234 is also assumed to assert TRDY# after PCI-bus clock cycle 17, so that the data of access C is transferred on the rising edge which terminates clock cycle 19.

The illustration of FIG. 3 assumes finally that the host CPU 210 does not drive any new data write access on the data bus after access C, or at least not within the time frame illustrated in the figure. Therefore, by the time of the data transfer of access C over the PCI-bus 226, i.e., clock cycle 19, the system controller 557 has not yet detected any further burstable write accesses on the host bus. As indicated in the figure, the system controller 557 thus negates FRAME# after clock cycle 19, leaving IRDY# asserted, to indicate a final data phase of the PCI-bus transaction. The data transfer time of the final data phase is at the rising edge of clock cycle 21, but the system controller 557 inhibits any actual data transfer at that time by negating all of the byte enables C/BE#(3:0) for clock cycle 21. Thus, whereas the PCI-bus transaction lasts until clock cycle 21, the burst itself is completed after clock cycle 19.

It can be seen that when the aggressive bursting technique of the embodiment to FIG. 2 is used, a dummy final data phase (between clock cycles 19 and 21 in the illustration of FIG. 3) is always added to the end of a burst data write transaction on the PCI-bus. However, this penalty, in the right circumstances, can be greatly outweighed by avoiding the penalty incurred when the transaction is broken unnecessarily. The aggressive bursting technique reduces the likelihood of such unnecessary breaks.

Under certain conditions, it may be that the penalty of the final dummy data phase is not outweighed by avoidance of penalties for breaking transactions. The chip set in FIG. 2 is therefore programmable by the CPU 210 to inhibit aggressive bursting, and return instead to the more conservative bursting techniques of conventional systems.

In addition, in a different embodiment, the chip set might implement, or be programmable to implement, a "very aggressive" bursting mode, in which the bridge does not determine burstability of a subsequent data write access until it is ready to assert IRDY# to transfer the data of that subsequent access. For example, in the illustration of FIG. 3, a bridge which implements very aggressive bursting would not need to determine the burstability of access B until clock cycle 11, and would not need to determine the burstability of access C until clock cycle 17. The downside of such very aggressive bursting is that the final dummy data phase, and therefore the penalty incurred in each transaction in which very aggressive bursting is used, is lengthened. Where a bridge always inserts one wait state at the beginning of each data phase, such as the bridge in FIG. 2, the final data phase would begin after clock cycle 19 (FIG. 3) with IRDY# negated for one PCI-bus clock cycle, and would continue after clock cycle 21 with IRDY# asserted, FRAME# negated, and all of the byte enables negated, to conclude with clock cycle 23. (Note that Revisions 2.0 and 2.1 of the PCI-bus specification do not permit the bridge to delay the assertion of byte enable information on the C/BE# lines. If a future revision of the PCI-bus specification, or if some other specification, does allow such delay, then very aggressive bursting can be implemented in this manner.)

Figure 4:
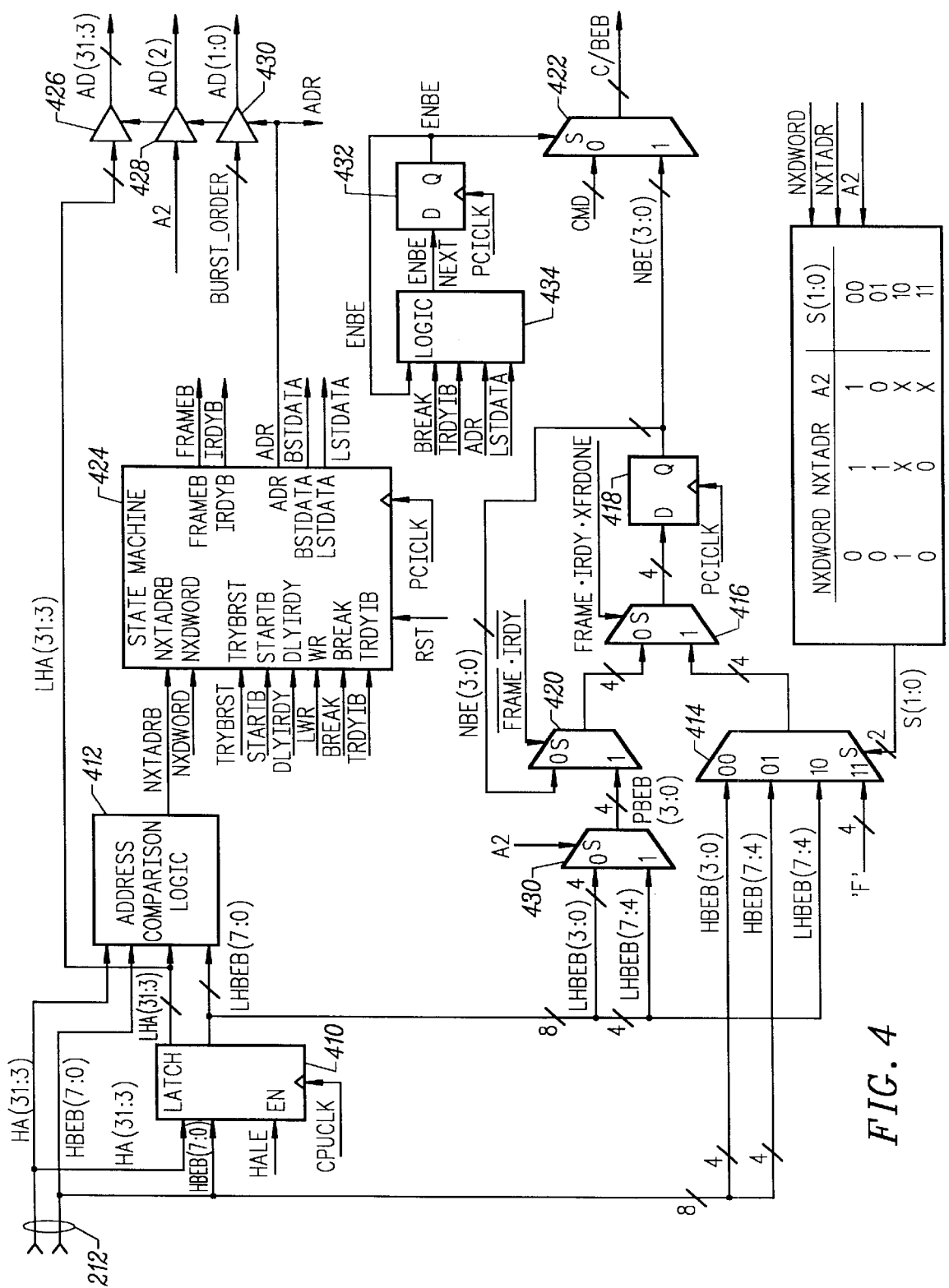
FIG. 4 is a block diagram detail of pertinent parts of the system controller of FIG. 2.

FIG. 4 is a block diagram of pertinent parts of the system controller 557. The suffix B is used on signal names internal to the system controller chip to mean the same thing that the suffix # means at the block diagram level of FIG. 2. It will be understood that signal names which otherwise match those used externally to the chip are essentially the same signals, any differences being unimportant for the understanding of the invention. Thus, for example, HBEB(7:0) represents essentially the same 8 byte enable signals as HBE#(7:0) in FIG. 2.

Referring to FIG. 4, the host bus address lines HA(31:3) and HBEB(7:0) are provided to data input port of a latch 410. Latch 410 is enabled by a signal HALE. The latch is normally transparent. HALE goes inactive at the same time each BRDY# is asserted to the CPU and remains inactive (keeping the latch output constant) until the corresponding PCI-bus cycle completes. The data outputs of the latch 410 are connected to address comparison logic 412, which also receives HA(31:3) and HBEB(7:0) from the host address bus 212. Address comparison logic 412 determines in a conventional manner whether the address (including byte enables) which is currently on the host address bus 212, is a sequentially next address (according to a chosen bursting order on the PCI-bus) relative to the address (including byte enables) stored in the latch 410 from the immediately previous cycle on the host bus. If so, then address comparison logic 412 asserts a NXTADRB output signal, and otherwise negates such output signal.

The system controller 557 also includes a state machine 424, as shown in FIG. 4. The state machine 424 is synchronous to the PCI-bus clock. The signal inputs to and outputs from the state machine 424 are described in Table II below.

TABLE II

| Signal Name | Direction (viewed from state machine) | Description |
| --- | --- | --- |
| NXTADRB | Input | Next address on Host Bus is sequentially next-in-order to the current address, according to PCI-bus burst order. The next transfer over the PCI-bus is burstable with the current transfer if either NXTADRB or NXDWORD is asserted. Generated by address comparison logic 412. |
| NXDWORD | Input | Current access is a 64-bit access, and the high-order half has not yet been translated onto PCI-bus. The next transfer over the PCI-bus is burstable with the current transfer if either NXTADRB or NXDWORD is asserted. |
| TRYBRST | Input | Decode of register bits programmable in system controller 557 to enable Aggressive Bursting. |
| STARTB | Input | Indicates that no device has claimed a new host bus access cycle by a predefined deadline after ADS#, and that the cycle is not directed to local DRAM. When asserted, system controller 557 starts a PCI-bus cycle. |
| DLYIRDY | Input | Signal from other logic in chipset indicating that IRDY# should be delayed for a new data phase even though NXTADR, NXDWORD and STARTB may all indicate readiness to proceed. |
| LWR | Input | Latched host bus W/R# signal |
| BREAK | Input | Asserted on early termination conditions for the PCI-bus transaction, such as the PCI-bus Target's STOP signal and Master Abort. |
| TRDYIB | Input | PCI-bus target's TRDY# signal. |
| RST | Input | Reset |
| PCICLK | Input | PCI-bus clock signal. |
| FRAMEB | Output | PCI-bus FRAME# signal. |
| IRDYB | Output | PCI-bus IRDY# signal. |
| ADR | Output | State Machine 424 is in state ADR. |
| BSTDATA | Output | State Machine 424 is in state BSTDATA. |
| LSTDATA | Output | State Machine 424 is in state LSTDATA. |

Figure 5:
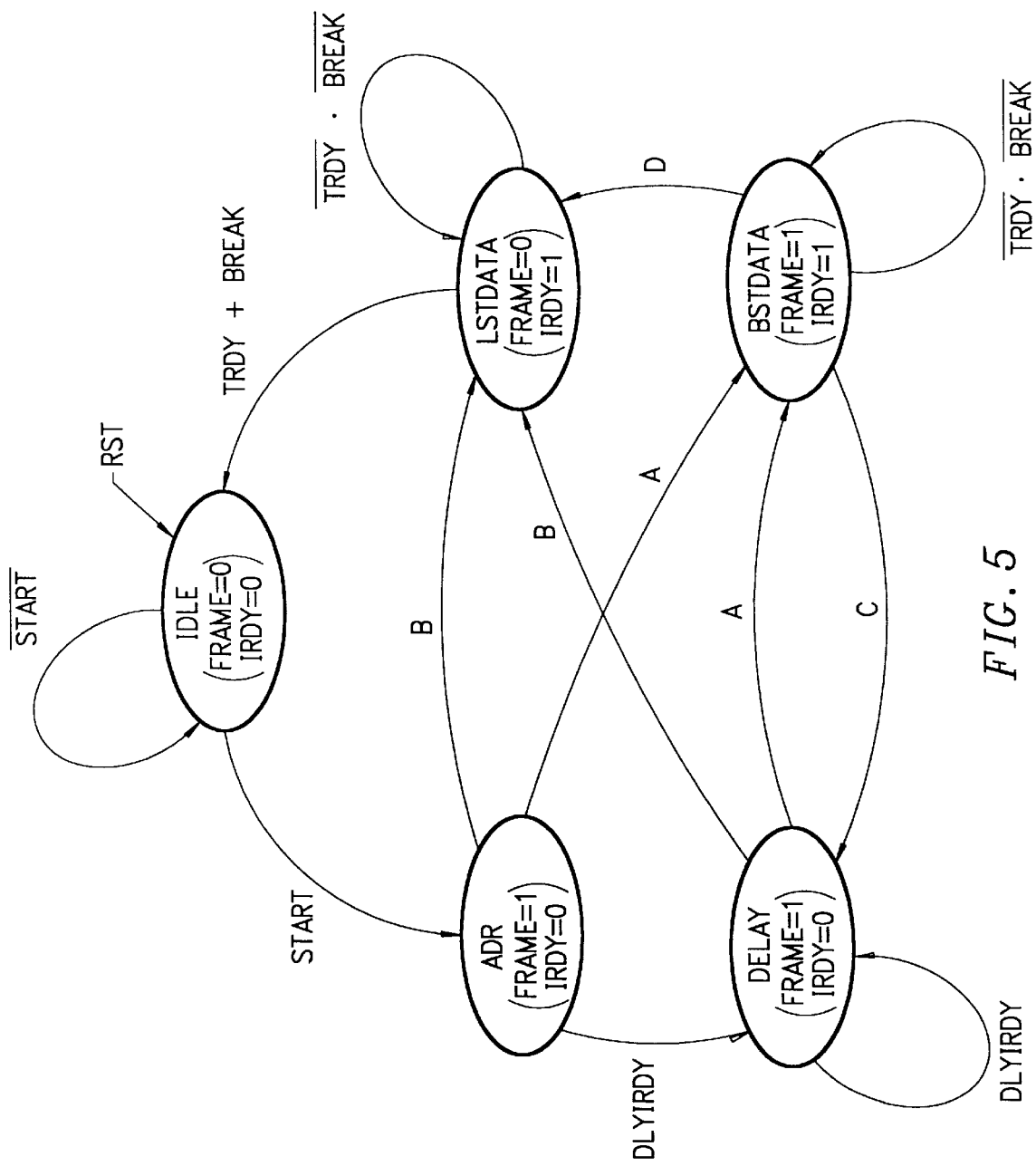
FIG. 5 is a state transition diagram for the state machine of FIG. 4.

FIG. 5 is a state machine diagram for the state machine 424, describing its operation to the extent is applies to the present description. It will be appreciated that state diagrams can be implemented in circuitry (using, for example, flip-flops or other synchronous circuits) or software, and given the diagram, such an implementation would be apparent to a person of ordinary skill. Additionally, whereas state machines are a convenient way to represent the output sequences which are to be generated by a circuit in response to predefined input signal sequences, it will be understood that different embodiments need not use the same states or state transitions as described herein for implementing the circuit. It is the sequence of output signals generated by the circuit in response to an input signal sequence which is important, not what internal states are defined and implemented for causing such sequences of output signals to take place.

Referring to FIG. 5, the state IDLE is the reset state. The machine will remain in the IDLE state for as long as START remains negated. The state machine 424 keeps its FRAME and IRDY outputs negated while it is in the IDLE state.

When START is sampled asserted, the state machine 424 transitions to state ADR, in which it asserts FRAME and maintains IRDY negated. This is the address phase of the PCI-bus transaction. Outside of state machine 424, as shown in FIG. 4, ADR enables buffers 426, 428 and 430 to drive the address on LHA(31:3) onto the PCI-bus AD(31:3) signal lines, an A2value onto AD(2), and the burst ordering indication onto AD(1:0). A2 is computed according to the formula:

$$A2 = LHBEB(3) \cdot LHBEB(2) \cdot LHBEB(1) \cdot LHBEB(0) + SEC\_CYC,$$

where $SEC_{13}$ CYC is asserted in the second PCI-bus data phase caused by a 64-bit host bus access cycle.

Referring again to FIG. 5, if DLYIRDY is sampled asserted while the state machine 424 is in state ADR, the machine transitions to a state DELAY, in which it remains until DLYIRDY is sampled negated. The state machine 424 continues to assert FRAME and negate IRDY while in the DELAY state, thereby effectively extending the address phase of the PCI-bus transaction.

From either state ADR or DELAY, if condition A is sampled true, then the state machine 424 transitions to a BSTDATA state in which FRAME and IRDY are both asserted. Condition A is defined as:

$$A = \overline{DLYIRDY}[\overline{WR} \cdot NXDWORD + WR(TRYBURST + NXDWORD + NXTADR)]$$

Essentially, therefore, the state machine 424 starts a burst data phase of the PCI-transaction in a conventional manner if either NXDWORD or NXTADR is sampled asserted. Importantly, the state machine 424 also starts a data phase if aggressive bursting is enabled (TRYBURST=1), whether or not NXDWORD or NXTADR are sampled asserted for a next data phase.

The state machine 424 remains in state BSTDATA for as long as TRDY and BREAK remain sampled negated, thereby extending the data phase until the target asserts its TRDY# signal or a break is encountered. When TRDY or BREAK is sampled asserted, and either NXDWORD or NXTADR is asserted as well, then condition C is satisfied and the state machine transitions to state DELAY to thereby end the data phase and insert a 1-clock cycle wait state (longer if DLYIRDY is asserted). Condition C is defined as:

$$C = (BREAK + TRDY) \cdot [\overline{WR} + WR(NXDWORD + NXTADR)]$$

If, while in state BSTDATA, TRDY is sampled asserted at a time when both NXTADR and NXDWORD are sampled negated, then a condition D is satisfied and the state machine 424 transitions to a state LSTDATA. Condition D is defined as:

$$D = (BREAK + TRDY) \cdot WR \cdot \overline{NXDWORD} \cdot \overline{NXTADR}$$

In state LSTDATA, state machine 424 negates FRAME and asserts IRDY, thereby performing a final data phase of the PCI-bus transaction. It will be seen from the further description below with respect to FIG. 4, that if the aggressive bursting mode is enabled, all byte enables on the PCI-bus are negated to inhibit any actual data transfer during such last data phase. Returning to FIG. 5, the state machine 424 remains in state LSTDATA until either TRDY or BREAK are sampled asserted, at which time the machine transitions back to the IDLE state.

In states ADR and DELAY, if a condition B is sampled true, then the state machine 424 transitions directly to state LSTDATA to perform the final data phase. Condition B is defined as:

$$B = \overline{DLYIRDY}[\overline{WR} \cdot \overline{NXDWORD} + WR \cdot TRYBURST \cdot \overline{NXDWORD} \cdot \overline{NXTADR}]$$

That is, if a data phase has begun with neither NXDWORD nor NXTADR asserted, with aggressive bursting disabled, then the current data phase will be made the last data phase of the transaction as in conventional systems.

Returning to FIG. 4, the lower half, HBEB(3:0), of the host byte enables, are connected to a '00' input of a 4-input, 4-bit wide multiplexor 414. The high order half, HBEB(7:4), is connected to input port '01' of the multiplexor 414. The high order half, LHBEB(7:4), of the latched version of the byte enables, as output by latch 410, is provided to the '10' input port of multiplexor 414, and all four bits of input port '11' of multiplexor 414 are connected to a logic 1 so as to provide the hex value 'F'.

The high order half LHBEB(7:4) of the latched byte enables is also provided to the '1' input port of a 2-input multiplexor 430, the '0' input port of which is connected to receive the lower order half, LHBEB(3:0).

The output port of multiplexor 430, designated PBEB (3:0), is provided to the '1' input port of another 2-input multiplexor 420, the output of which is connected to the '0' input port of yet another multiplexor 416. The output of multiplexor 414 is connected to the '1' input port of multiplexor 416. The output of multiplexor 416 is connected to the D input register 418, clocked by the PCI-clock signal. The Q output of register 418, designated NBE(3:0), is fed back to the '0' input port of multiplexor 420.

NBE(3:0) is connected to the '1' input port of a 2-input multiplexor 422, the output of which is C/BEB(3:0) for driving the PCI-bus C/BE# signal lines. The '0' input port of multiplexor 422 receives a 4-bit command signal.

The select input of multiplexor 422 receives an ENBE signal, which is the output of a flip-flop 432, which is clocked on the PCI-clock. The D input of flip-flop 432 receives an ENBE_NEXT value produced by a logic block 434, according to the following formula.

$$ENBE\_NEXT = [\overline{(TRDYI + BREAK) \cdot LSTDATA}]ENBE + ADR$$

It can be seen that whenever the state machine 424 is in state ADR, indicating that the PCI-bus transaction is in an address phase, ENBE_NEXT is high. Therefore, on the next clock cycle, multiplexor 422 will select the NBE(3:0) byte enables onto the PCI-bus C/BE#(3:0) signal lines. ENBE_NEXT then remains high until either the PCI-bus target asserts TRDY# or a break occurs, while the state machine 424 is in state LSTDATA. This condition indicates the end of the final data phase of a transaction, and causes the multiplexor 422 to select the next command onto C/BE#(3:0) in the next PCI-bus clock cycle.

NBE(3:0), as previously explained, is provided by the Q output of register 418, the D input of which is connected to the output of multiplexor 416. The select input of multiplexor 416 receives a value given by:

$$FRAME \cdot IRDY \cdot XFRDONE$$

where $$XFRDONE = TRDYI + BREAK \cdot \overline{DEVSELI}$$

(DEVSELI is essentially the PCI-bus target's DEVSEL signal.) The '0' input of multiplexor 416 receives the output of multiplexor 420, the select input of which receives a value given by:

$$\overline{FRAME \cdot IRDY}$$

The net effect of multiplexors 416 and 420 is the following. First, when the state machine 424 is in its IDLE state, the register 418 is loaded from PBEB(3:0). Second, at the end of each burst data phase, except the final burst data phase (state machine 424 in state LSTDATA), the register 418 is loaded from the 4-input multiplexor 414. Third, at all other times, the register 418 holds its prior value.

PBEB receives its value from multiplexor 430, the select input of which is connected to receive A2, as defined above.

Accordingly, for a 32-bit host bus access cycle, multiplexor 430 selects whichever half of the latched host byte enable bits correspond to the dword containing the valid data. For a 64-bit host bus cycle, multiplexor 430 will select LHBEB (3:0) because A2=0.

For the subsequent data phases of the PCI-bus transaction, the 4-input multiplexor 414 selects from its input ports in accordance with the following table (X=don't care):

TABLE III

| NXDWORD | NXTADR | A2 | S(1:0) |
|---------|--------|----|--------|
| 0 | 1 | 1 | 00 |
| 0 | 1 | 0 | 01 |
| 1 | X | X | 10 |
| 0 | 0 | X | 11 |

As can be seen, for the second PCI-bus data phase caused by a 64-bit host bus cycle, (i.e., NXDWORD=1), the multiplexor 414 will select the high order half, LHBEB(7:4), of the host byte enable bits. In all other situations in which the next data write access on the host has been determined to be burstable (i.e., NXTADR=1), the multiplexor 414 will select for the next data phase, the half of HBEB(7:0) which is opposite the half which is on the PCI-bus for the current data phase. That is, if A2=1, multiplexor 414 will select HBEB (3:0) for the next data phase. If A2=0, multiplexor 414 will select HBEB(7:4) for the next data phase. Finally, if NXDWORD and NXTADR are both negated, then as indicated in the table, multiplexor 414 will select the value 'F' for driving onto C/BE#(3:0) for the next data phase. This occurs only when the next data phase is the dummy final data phase of an aggressively bursted PCI-bus transaction.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. A method for controlling a variable length burst data write transaction on a peripheral bus, comprising the steps of:

performing a burst of at least one data transfer of said transaction on said peripheral bus from a source device to a destination device, each of said data transfers of said burst occurring at a respective data transfer time;

establishing a length of said transaction by indicating to said destination device, during said transaction, that a next data transfer time is to be a final data transfer time of said transaction; and inhibiting any data transfer on said peripheral bus at said final data transfer time.

2. Apparatus according to claim 1, wherein each of said data transfer times is defined by a respective clock cycle for which ready signals are asserted by both said source device and said destination device.

3. A method according to claim 2, wherein said source device asserts a first signal prior to all of said data transfer times and maintains said first signal asserted for all of said data transfer times of said burst, and wherein said step of indicating comprises the step of negating said first signal for said final data transfer time.

4. A method according to claim 3, wherein said peripheral bus has a data path from said source device to said destination device which is n data units in width, n>0, said peripheral bus further having a respective enable signal corresponding to each of said data units of said data path, wherein said step of performing a burst of at least one data transfer comprises the step of asserting selected ones of said enable signals for each of said data transfer times of said burst, said destination device clocking in data at each particular data transfer time of said burst only from those data units of said data path whose corresponding enable signals are asserted for the particular data transfer time, and wherein said step of inhibiting any data transfer at said final data transfer time comprises the step of negating all of said enable signals for said final data transfer time.

5. A method for controlling a burst data write transaction on a peripheral bus which has a data path from said source device to said destination device that is n data units in width, n>0, said peripheral bus further having a respective enable signal corresponding to each of said data units of said data path, comprising the steps of:

performing a burst of at least one data transfer of said transaction on said peripheral bus from a source device to a destination device, each of said data transfers of said burst occurring at a respective data transfer time;

indicating to said destination device that a next data transfer time is to be a final data transfer time of said transaction: and inhibiting any data transfer on said peripheral bus at said final data transfer time, wherein said step of inhibiting any data transfer at said final data transfer time comprises the step of negating all of said enable signals for said final data transfer time.

6. A method according to claim 5, wherein said step of performing a burst of at least one data transfer comprises the step of asserting selected ones of said enable signals for each of said data transfer times of said burst, said destination device clocking in data at each particular data transfer time of said burst only from those data units of said data path whose corresponding enable signals are asserted for the particular data transfer time.

7. A method for controlling a burst data write transaction on a peripheral bus, for use with an originating bus carrying a plurality of data write accesses including a first data write access in response to which said source device begins said burst data write transaction and in response to which a first one of said data transfers of said burst is performed, comprising the steps of:

performing a burst of at least one data transfer of said transaction on said peripheral bus from a source device to a destination device, each of said data transfers of said burst occurring at a respective data transfer time;

indicating to said destination device that a next data transfer time is to be a final data transfer time of said transaction; and inhibiting any data transfer on said peripheral bus at said final data transfer time, wherein said step of indicating that a next data transfer time is to be a final data transfer time, is performed in response to failure by said source device to detect pendency at the data transfer time of a given one of said data transfers of said burst, of any next data transfer which is burstable with said given data transfer on said peripheral bus.

8. A method according to claim 7, wherein said plurality of data write accesses on said originating bus includes a given data write access in response to which said given data transfer is completed on said peripheral bus, and wherein said failure by said source device to detect pendency at the data transfer time of a given one of said data transfers of said burst, of any next data transfer which is burstable with said given data transfer on said peripheral bus, comprises the steps of:

detecting, at the data transfer time of said given data transfer, that no further data transfers are required on said peripheral bus in response to said given data write access on said originating bus; and failing to detect, by the data transfer time of said given data transfer, any next data write access on said originating bus which is burstable with said given data transfer on said peripheral bus.

9. A method according to claim 7, wherein each data transfer of said burst except said first data transfer has a respective prior data transfer of said burst, and wherein said step of performing a burst of at least one data transfer of said transaction comprises the step of performing each particular data transfer of said burst except said first data transfer of said burst in response to detection by said source device, at the data transfer time of the data transfer prior to the particular data transfer, that said particular data transfer is burstable with the prior data transfer on said peripheral bus.

10. A method for controlling a transaction between an initiator and a target on a bus, said bus having a protocol including a burst data write transaction protocol according to which a burst data write transaction begins in response to assertion by said initiator of a first signal, and according to which data transfer times of the transaction are defined by a ready signal from said initiator and a ready signal from said target both being sampled asserted concurrently during the transaction, and according to which said initiator can end the transaction by negating said first signal for a final one of said data transfer times of the transaction, and according to which a data transfer takes place at each of said data transfer times unless inhibited, comprising the steps of:

asserting said first signal to begin a particular burst data write transaction according to said burst data write transaction protocol;

asserting said ready signal from said initiator for a first data transfer time of said particular transaction; and for a final data transfer time of said particular transaction, negating said first signal, asserting said ready signal from said initiator, and inhibiting any data transfer of said transaction.

11. A method according to claim 10, wherein said bus has a data path from said initiator to said target which is n data units in width, n>0, said bus further having respective enable signals corresponding to each of said data units of said data path, wherein said step of inhibiting any data transfer of said transaction for said final data transfer time, comprises the step of negating all of said enable signals for said final data transfer time.

12. A method according to claim 11, further comprising the step of asserting at least one of said enable signals for said first data transfer time of said particular transaction.

13. A method for controlling a PCI-bus, for use with a PCI-bus clock signal, comprising the steps of:

for a first clock cycle of said clock signal, asserting a PCI-bus FRAME# signal;

for a second clock cycle of said clock signal after said first clock cycle, asserting a PCI-bus IRDY# signal while maintaining said FRAME# signal asserted; and for a third clock cycle of said clock signal after said second clock cycle, negating said FRAME# signal with said IRDY# signal asserted and all byte enable signals of said PCI-bus negated.

14. A method according to claim 13, further comprising the step of asserting at least one of said byte enable signals for said second clock cycle.

15. A method according to claim 13, further comprising the step of, for a fourth clock cycle of said clock signal, between said second and third clock cycles, asserting said IRDY# signal while maintaining said FRAME# signal asserted.

16. Apparatus for controlling a burst data write transaction on a peripheral bus, comprising:

means for performing a burst of at least one data transfer of said transaction on said peripheral bus from a source device to a destination device, each of said data transfers of said burst occurring at a respective data transfer time;

means for establishing a length of said transaction by indicating to said destination device, during said transaction, that a next data transfer time is to be a final data transfer time of said transaction; and means for inhibiting any data transfer on said peripheral bus at said final data transfer time.

17. Apparatus according to claim 16, wherein each of said data transfer times is defined by a respective clock cycle for which ready signals are asserted by both said source device and said destination device.

18. Apparatus according to claim 17, wherein said source device asserts a first signal prior to all of said data transfer times and maintains said first signal asserted for all of said data transfer times of said burst, and wherein said means for indicating comprises circuitry which negates said first signal for said final data transfer time.

19. Apparatus according to claim 18, wherein said peripheral bus has a data path from said source device to said destination device which is n data units in width, n>0, said peripheral bus further having a respective enable signal corresponding to each of said data units of said data path, wherein said means for performing a burst of at least one data transfer comprises circuitry which asserts selected ones of said enable signals for each of said data transfer times of said burst, said destination device clocking in data at each particular data transfer time of said burst only from those data units of said data path whose corresponding enable signals are asserted for the particular data transfer time, and wherein said means for inhibiting any data transfer at said final data transfer time comprises circuitry which negates all of said enable signals for said final data transfer time.

20. Apparatus for controlling a burst data write transaction on a peripheral bus having a data path from said source device to said destination device which is n data units in width, n>0, said peripheral bus further having a respective enable signal corresponding to each of said data units of said data path, comprising:

means for performing a burst of at least one data transfer of said transaction on said peripheral bus from a source device to a destination device, each of said data transfers of said burst occurring at a respective data transfer time;

means for establishing a length of said transaction by indicating to said destination device, during said transaction, that a next data transfer time is to be a final data transfer time of said transaction; and means for inhibiting any data transfer on said peripheral bus at said final data transfer time, wherein said means for inhibiting any data transfer at said final data transfer time comprises circuitry which negates all of said enable signals for said final data transfer time.

21. Apparatus according to claim 20, wherein said means for performing a burst of at least one data transfer comprises circuitry which asserts selected ones of said enable signals for each of said data transfer times of said burst, said destination device clocking in data at each particular data transfer time of said burst only from those data units of said data path whose corresponding enable signals are asserted for the particular data transfer time.

22. Apparatus for controlling a burst data write transaction on a peripheral bus, for use with an originating bus carrying a plurality of data write accesses including a first data write access in response to which said source device begins said burst data write transaction and in response to which a first one of said data transfers of said burst is performed, comprising:

means for performing a burst of at least one data transfer of said transaction on said peripheral bus from a source device to a destination device, each of said data transfers of said burst occurring at a respective data transfer time;

means for establishing a length of said transaction by indicating to said destination device, during said transaction, that a next data transfer time is to be a final data transfer time of said transaction; and means for inhibiting any data transfer on said peripheral bus at said final data transfer time, wherein said means for indicating that a next data transfer time is to be a final data transfer time, is responsive to failure by said source device to detect pendency at the data transfer time of a given one of said data transfers of said burst, of any next data transfer which is burstable with said given data transfer on said peripheral bus.

23. Apparatus according to claim 22, wherein said plurality of data write accesses on said originating bus includes a given data write access in response to which said given data transfer is completed on said peripheral bus, and wherein said failure by said source device to detect pendency at the data transfer time of a given one of said data transfers of said burst, of any next data transfer which is burstable with said given data transfer on said peripheral bus, comprises circuitry which:

detects, at the data transfer time of said given data transfer, that no further data transfers are required on said peripheral bus in response to said given data write access on said originating bus; and fails to detect, by the data transfer time of said given data transfer, any next data write access on said originating bus which is burstable with said given data transfer on said peripheral bus.

24. Apparatus according to claim 22, wherein each data transfer of said burst except said first data transfer has a respective prior data transfer of said burst, and wherein said means for performing a burst of at least one data transfer of said transaction comprises circuitry which performs each particular data transfer of said burst except said first data transfer of said burst in response to detection by said source device, at the data transfer time of the data transfer prior to the particular data transfer, that said particular data transfer is burstable with the prior data transfer on said peripheral bus.

25. Apparatus for controlling a transaction between an initiator and a target on a bus, said bus having a protocol including a burst data write transaction protocol according to which a burst data write transaction begins in response to assertion by said initiator of a first signal, and according to which data transfer times of the transaction are defined by a ready signal from said initiator and a ready signal from said target both being sampled asserted concurrently during the transaction, and according to which said initiator can end the transaction by negating said first signal for a final one of said data transfer times of the transaction, and according to which a data transfer takes place at each of said data transfer times unless inhibited, comprising a synchronous circuit which:

asserts said first signal to begin a particular burst data write transaction according to said burst data write transaction protocol;

asserts said ready signal from said initiator for a first data transfer time of said particular transaction; and for a final data transfer time of said particular transaction, negates said first signal, asserts said ready signal from said initiator, and inhibits any data transfer of said transaction.

26. Apparatus according to claim 25, wherein said bus has a data path from said initiator to said target which is n data units in width, n>0, said bus further having respective enable signals corresponding to each of said data units of said data path, wherein said circuit inhibits any data transfer of said transaction for said final data transfer time, by negating all of said enable signals for said final data transfer time.

27. Apparatus according to claim 26, wherein said circuit further asserts at least one of said enable signals for said first data transfer time of said particular transaction.

28. Apparatus for controlling a PCI-bus, for use with a PCI-bus clock signal, comprising a synchronous circuit having:

a first state in which said circuit asserts a PCI-bus FRAME# signal;

a second state occurring after said first state, in which said circuit asserts a PCI-bus IRDY# signal while maintaining said FRAME# signal asserted; and a third state occurring after said second state, in which said circuit negates said FRAME# signal with said IRDY# signal asserted and all byte enable signals of said PCI-bus negated.

29. Apparatus according to claim 28, wherein in said second state, said circuit further asserts at least one of said byte enable signals.

30. Apparatus according to claim 28, wherein said circuit further comprises a fourth state, occurring between said second and third states, in which said circuit asserts said IRDY# signal while maintaining said FRAME# signal asserted.

* * * * *